L. C. SCHNEIDER.
METHOD OF MAKING FLANGED PIPE.
APPLICATION FILED APR. 21, 1915.
1,222,679.
Patented Apr. 17, 1917.
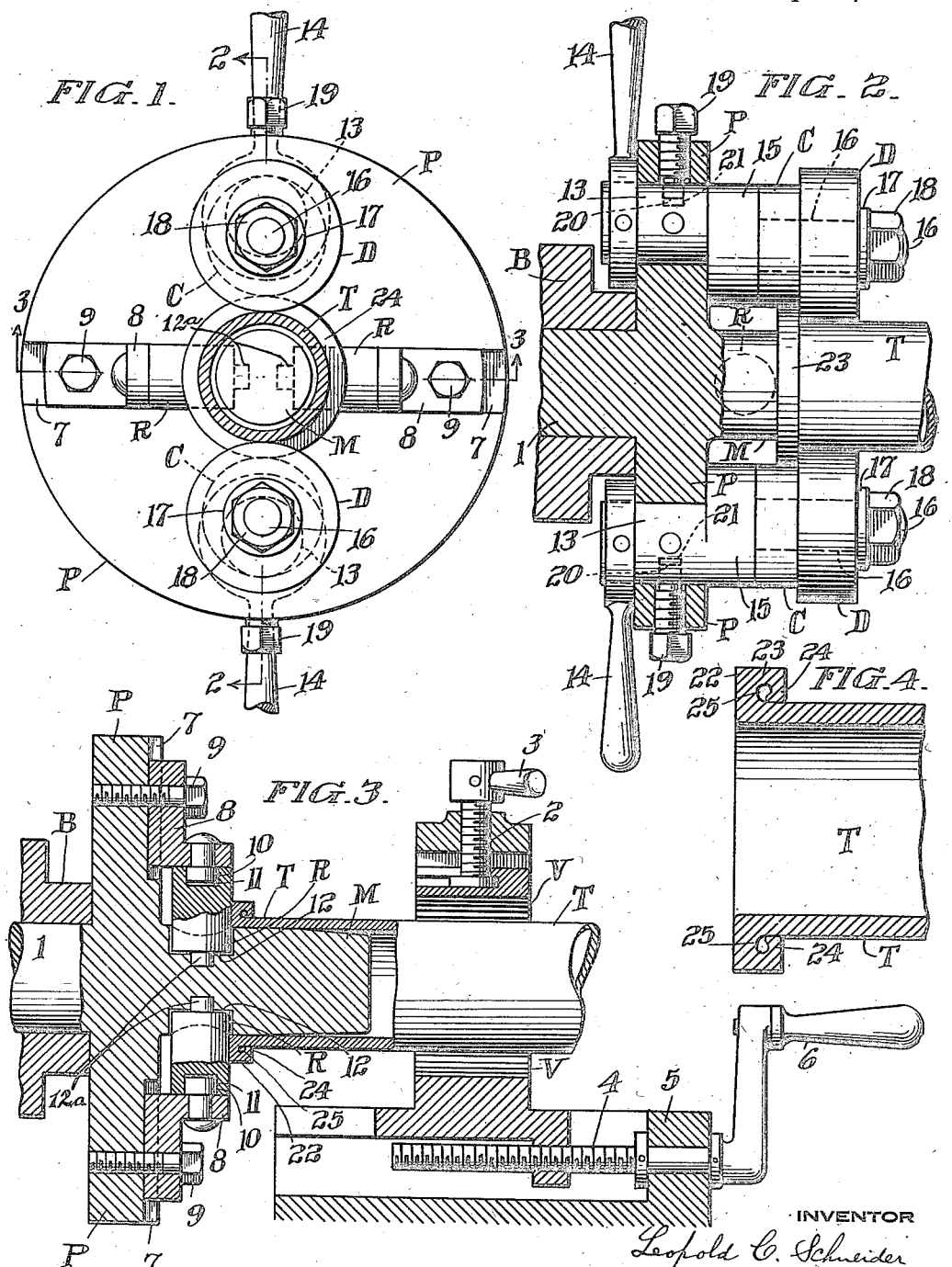

UNITED STATES PATENT OFFICE.

LEOPOLD C. SCHNEIDER, OF PHILADELPHIA, PENNSYLVANIA.

METHOD OF MAKING FLANGED PIPE.

1,222,679.

Specification of Letters Patent.

Patented Apr. 17, 1917.

Application filed April 21, 1915. Serial No. 22,784.

*To all whom it may concern:*

Be it known that I, LEOPOLD C. SCHNEIDER, a citizen of the United States, residing in the city of Philadelphia, county of Philadelphia, and State of Pennsylvania, have invented certain new and useful Improvements in Methods of Making Flanged Pipe, of which the following is a specification.

My invention relates to a method of forming on a tube or pipe of any suitable metal, and particularly of iron or steel, a flange which shall be of substantial thickness at its outer margin; and in a method for forming such a flange which shall be further reinforced by an integral extension backwardly parallel with the tube or pipe, which latter extension may be turned in toward or abut against the outer wall of the pipe.

My invention relates to a method such as above outlined which I have found suitable for flanging not only pipes of large diameter, but also pipes of so-called small diameter, for example, two inches or less in diameter.

For an illustration of one form of apparatus suitable for carrying out my method or process, and for an illustration of an example of a pipe flanged according to my process, reference is to be had in the accompanying drawing, in which:

Figure 1 is a front elevational view of the rolls and roll supporting member, the pipe flange being shown in elevation, and the pipe itself in section.

Fig. 2 is a side elevational view, partly in vertical section, taken on the line 2—2 of Fig. 1.

Fig. 3 is a view, partly in section and partly in elevation, taken on the line 3—3 of Fig. 1, with pipe clamping and feeding means shown partially in section and partially in elevation.

Fig. 4 is a sectional view, on larger scale, of a flange produced by my method.

B represents a bearing in which rotates the spindle or shaft 1 which rotates the plate or disk P which carries or with which rotates the mandrel or roll M extending into the interior of the tube or pipe T which is to be flanged.

V is a vise which upon actuation of the screw 2 by the handle 3 grips and holds the pipe T, the vise V being fed longitudinally by the screw 4 rotatable in the support or frame 5 by the handle 6.

In the slots 7 extending transversely in the plate P are disposed the bracket members 8 secured to the plate P by the bolts 9. Secured to the brackets 8 are the cylindrical bearings 10 extending into cylindrical holes 11 in the rolls or members R which at their inner ends extend into cylindrical countersinks 12 in an extension from the plate P or in the mandrel M, the rolls R having the bearing pins 12$^a$.

In cylindrical holes in the plate P are disposed the shafts or pins 13 having secured thereto at their ends the handles 14 and having at their other ends the cheek or boss members 15 having the bearing pin extensions 16 on which are rotatable the rollers or members C and D held in position upon the pins or shafts 16 by the collars 17 backed by nuts 18 threaded on the shafts or pins 16. The rollers C and D may be separate or integral, preferably the latter.

Threaded in the periphery of the plate P are the screws 19 having ends 20 adapted to extend into holes 21 in the members 13 to hold the rollers C and D in operative position.

The axes of rotation of the rollers C and D are offset or eccentric with respect to the axes of the pins or shafts 13.

The operation is as follows:

The pipe T to be flanged, is preferably heated to suitably high temperature, particularly when of iron or steel, and is then gripped in the vise V and thrust longitudinally, by turning the crank 6, toward the plate P rotated by any suitable source of power.

The end of the pipe T is advanced over the mandrel or roll M into engagement with the rollers R, whereupon, by a further feeding by turning the handle 6, the metal at the end of the pipe will upset and flow outwardly, without splitting even with pipes of small diameter, in a plane normal to the axis of the tube T and tangent to the rolls R, the rolls R rotating on their bearings 10 and in the countersinks 12 during contact with the pipe.

The metal must flow outwardly because of the inner roll or mandrel M which prevents inward flow. The outwardly flowing metal then engages the rolls C, which limit the outward flow, and the rolls R prevent longitudinal flow in the direction of the pipe feed, and consequently the material can flow only backwardly longitudinally of the pipe T in contact with the rolls C until engagement or contact with the rolls D of larger diameter which extend to the outer surface of the pipe T. Then the metal can flow only inwardly diametrically along the face of the rolls D until it abuts against the pipe T.

The result is a flange of shape shown in the cross section in Figs. 3 and 4, such flange comprising the portion 22 which is at the extreme end of the pipe, the backwardly extending part 23, and the inwardly extending part 24.

As shown in Fig. 4 the flange is hollow, as indicated at 25. However, by further feeding the pipe longitudinally toward the left, as viewed in Fig. 3, still more metal of the pipe may be caused to flow into the flange portions, and to degree sufficient to completely fill up the open space 25.

Such a flange on a pipe is of great utility because of its thickness and strength at 22, flexure toward the right, Fig. 4, of the part 22 being opposed by the part 24 thrusting against the side of the pipe T and thereby stiffening the parts 22 and 23.

A pipe so flanged is suitable for various purposes, and particularly for making pipe connections for high pressure fluid systems of any sort, and for ammonia conducting systems.

When the flange has been formed by the process described, further feeding by the screw 4 is stopped, and by loosening the screws 19 the pins 20 are withdrawn from the holes 21, whereupon the handles 14 may be rotated, thus rotating the shafts or pins 13, which accordingly rotate the eccentrically disposed rollers C and D away from the pipe to a sufficient distance to allow withdrawal of the flange toward the right, Fig. 3, between the rollers D.

Then the next pipe may be introduced into position and the handles 14 rotated backwardly to bring the rolls C and D to the position indicated in Fig. 2, whereupon the screws 19 are again tightened to bring the pins 20 into the holes 21 to prevent rotation of the shafts 13.

What I claim is:

1. The method of flanging a pipe, which consists in working the end of the pipe outwardly to partially form the flange, working the partially formed flange backwardly, and simultaneously working metal of the pipe into the outwardly extending portion in replacement of the metal worked into the backwardly extending portion.

2. The method of flanging a pipe, which consists in working the end of the pipe outwardly to partially form the flange, working the partially formed flange backwardly and then inwardly, and simultaneously working metal of the pipe into the partially formed flange in replacement of the metal worked into the backwardly and inwardly extending portions.

3. The method of flanging a pipe, which consists in working the end of the pipe outwardly to partially form a flange and simultaneously limiting the end of said partially formed flange to form a flange face substantially normal to the axis of the pipe, working the partially formed flange backwardly and simultaneously limiting the periphery of the partially formed flange and backwardly worked metal to form a peripheral surface, and while working the partially formed flange backwardly working metal of the pipe into the outwardly extending flange portion in replacement of the backwardly worked metal.

4. The method of flanging a pipe, which consists in working the end of the pipe outwardly to partially form the flange, working the partially formed flange backwardly and then inwardly, simultaneously working metal of the pipe into the partially formed flange in replacement of the metal worked into the backwardly and inwardly extending portions, and while working the metal outwardly, backwardly and inwardly limiting the same to form front, peripheral and back flange surfaces.

5. The method of flanging a pipe, which consists in working all portions of the material of the end of the pipe outwardly and then backwardly and then inwardly to the outer surface of the pipe.

6. The method of flanging a pipe, which consists in working the end of the pipe outwardly and then backwardly and then inwardly to the outer surface of the pipe, the initially outwardly worked metal being the finally inwardly worked metal.

7. The method of flanging a pipe, which consists in working the end of the pipe outwardly and then backwardly and then inwardly to the outer surface of the pipe, an annular open space being formed between the inwardly, backwardly and outwardly worked metal.

8. The method of flanging a pipe, which consists in working the end of the pipe outwardly and then backwardly and then inwardly to the outer surface of the pipe, and facing the front of the outwardly worked metal and the back of the inwardly worked metal into planes substantially parallel to each other and normal with the axis of the pipe.

9. The method of flanging a pipe, which consists in rolling the end of the pipe outwardly to partially form the flange, rolling the partially formed flange backwardly, and simultaneously rolling metal of the pipe into the outwardly extending portion in replacement of the metal rolled into the backwardly extending portion.

10. The method of flanging a pipe, which consists in rolling the end of the pipe outwardly to partially form the flange, rolling the partially formed flange backwardly and then working the same inwardly, and simultaneously rolling metal of the pipe into the partially formed flange in replacement of the metal rolled and worked into the backwardly and inwardly extending portions.

In testimony whereof I have hereunto affixed my signature this 20th day of April, 1915.

LEOPOLD C. SCHNEIDER.